Dec. 11, 1945.   R. I. MARKEY   2,390,801
JOINTS FOR EXHAUST MANIFOLD SYSTEMS
Filed July 25, 1944
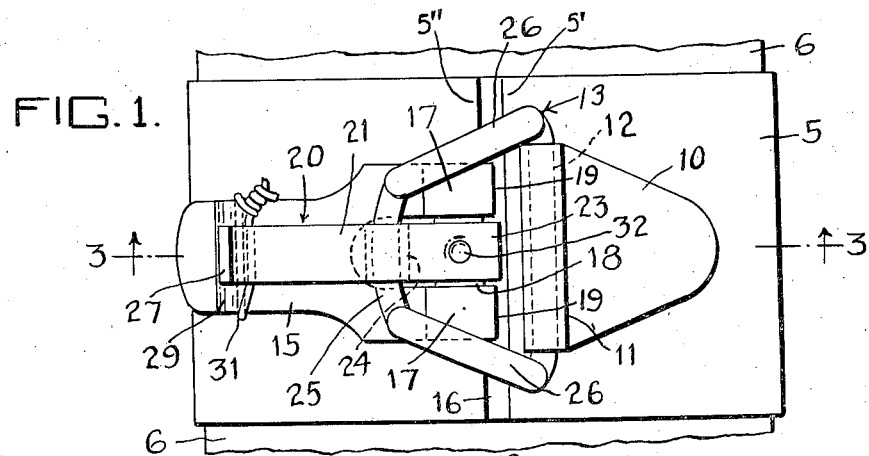
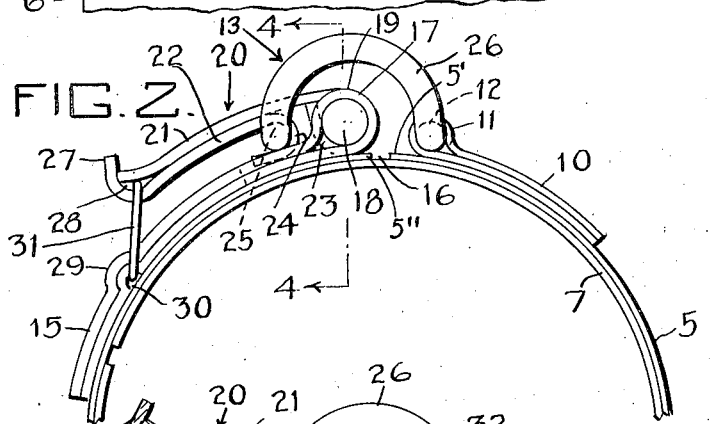
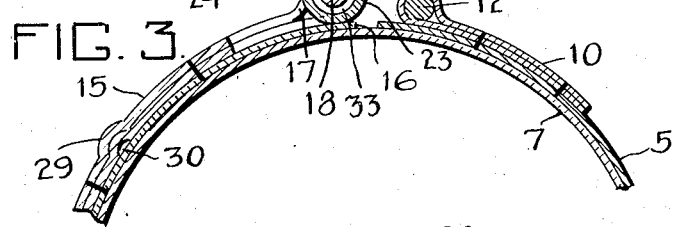
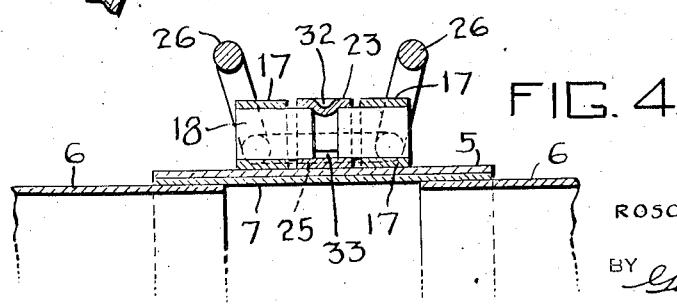
INVENTOR
ROSCOE I. MARKEY
BY *Geo. A. Senior*
ATTORNEY Patented Dec. 11, 1945

2,390,801

UNITED STATES PATENT OFFICE 2,390,801

JOINT FOR EXHAUST MANIFOLD SYSTEMS

Roscoe I. Markey, Montclair, N. J., assignor to Pollak Manufacturing Company, Arlington, N. J., a corporation of New Jersey Application July 25, 1944, Serial No. 546,531

3 Claims. (Cl. 24—19)

The invention relates to joints for an exhaust manifold system or other pipe systems used where extreme variations in temperature occur or large amounts of vibration are encountered, and has to do particularly with the means for securing the ends of a split clamping member forming the joint or a part thereof together.

The invention is particularly applicable to joints of the type disclosed in my prior Patents 2,323,823, dated July 6, 1943; 2,226,936, dated December 31, 1940; and 2,279,090, dated April 7, 1942. In all of these patents a ring-like locking member is pivoted at one end of the split clamping member. This locking ring takes over and engages a hook member secured to the other end of the split clamping member when the parts are in their locked position, and due to its shape and resiliency permits of expansion and contraction of the parts. In opening or closing the clamp it is necessary to employ a special tool. Ofttimes this tool becomes lost or misplaced and causes considerable inconvenience. It is essential that the locking ring exerts sufficient pressure to positively secure the clamp in its locked position. It has been found in practice that the strain imposed upon the locking ring in moving it from its open to closed position and vice versa often causes the locking ring to be over stressed or stretched beyond its elastic limit and when it is sprung into its locked position it will not exert sufficient pressure to tightly hold the parts together, thus frustrating the entire object of the invention.

The object of the present invention is to provide a means for securing the ends of the split clamping member together or separating them from each other in a most efficient manner without the utilization of a tool of any description. A further and more important object of the invention is the provision of a connection between the ends of the split clamping member, working in conjunction with the locking ring, whereby all excessive strains are eliminated on the ring in opening or closing the clamping member.

It will be understood the foregoing general description and the following detailed description are exemplary and explanatory of the invention but are not restrictive thereof. Other objects and advantages of the invention will become apparent as this specification proceeds.

Attention is hereby directed to the drawing in which a preferred embodiment of the invention is illustrated and in which:

Fig. 1 is a top plan view of the clamp, the parts being in the locked position;

Fig. 2 is a fragmentary view, the clamp being in its locked position;

Fig. 3 is a fragmentary sectional view taken on the line 3—3 of Fig. 1, the toggle being broken and the clamp partly released; and Fig. 4 is a fragmentary longitudinal sectional view taken on the line 4—4 of Fig. 2.

Referring again to the drawing the reference numeral 5 designates a split clamping member and 6—6 a pair of pipes or tubes to be connected together. A split liner 7 may be utilized as in my prior Patents 2,323,823 and 2,226,936. In the construction disclosed in Patent No. 2,279,090 where the clamping member functions purely as a supporting member the use of the liner is not necessary.

As in my prior patents means are provided for firmly securing the ends of the split clamping member together, this means having particularly in mind to permit of diametrical expansion and contraction of the clamping member to compensate for changes in dimensions of the parts due to heating and cooling.

Secured to one end 5' of the split clamping member by resistance welding or other suitable means: is a strap 10. The strap 10 is turned back on itself to form an eye 11 in which is pivoted one leg or section 12 of a locking member 13.

Secured by resistance welding or other means to the other end 5'' of the split clamping member is another strap 15. This strap is likewise bent back on itself and is bifurcated at its end adjacent the opening or gap 16 forming a pair of ears 19 which have eyes 17 therein in which is mounted a pivot pin 18.

Mounted on the pivot pin between the eyes 17 is a latch member 20. As illustrated the latch member is formed of two parts 21 and 22. However this is merely for convenience of construction and it might just as well be one piece formation if so desired. The upper portion 21 of the latch member has an eye 23 formed in one end thereof and this eye encircles the pin 18 between the eyes 17 to form the pivot for the latch member.

The lower portion 22 of the latch member has a hook 24 formed on its end adjacent the pivot 18 and this hook takes over another section or leg 25 of the locking member. The two legs 12 and 25 of the locking member are connected by arched resilient portions 26.

The end of the lower portion 22 of the latch member is bent up at 27 to form a finger piece. Adjacent the finger piece the two portions of the latch member are separated slightly to form an opening 28. The strap 15 has a bead 29 formed therein which provides a small opening 30 between the split clamping member 5 and the strap 15. In the locked position as shown in Figs. 1 and 2 a safety lockwire may be threaded through the openings 28 and 30 if so desired.

The eye portion 23 of the latch member has a dimple 32 pressed therein. This dimple engages a groove 33 in the pin 18 and prevents longitudinal movement of the pin.

From an inspection of Figs. 2 and 3 of the drawing it will be apparent the latch member has a toggle-like action. In the locked position of Fig. 2 the toggle is below dead center and the arched portions 26 of the locking member have sufficient inherent resiliency therein to hold the parts firmly and positively together. In moving the latch member from the locked position of Fig. 2 to the released position of Fig. 3 the amount of deformation occurring in the locking member is reduced to an absolute minimum as the movement is so slight. Therefore the possibility of over stressing or straining the locking member beyond its elastic limit is eliminated thus greatly adding to the life of the joint. In addition the locking member may be readily moved from one position to the other with the fingers thus doing away with the use of any special tools such as were necessary in the devices of my aforesaid mentioned patents. A continued movement of the latch member and locking member to the right in Fig. 3 will result in the latch member and locking member becoming disengaged from each other.

Changes in details of construction such as would occur to one skilled in the art are to be considered as coming within the spirit of the invention as set forth in the appended claims.

I claim:

1. A split clamping member formed of a single strip of metal of a width sufficient for securing the ends of a pair of tubular members of an exhaust manifold system together so as to permit of longitudinal expansion and contraction of said pair of members due to changes in temperature, the ends of said split clamping member being separated by a short gap when positioned on said tubular members, a locking member comprising two substantially parallel legs having their ends connected together by arched resilient portions, said split clamping member having one leg of said locking member pivoted adjacent one of its ends, a latch member pivoted adjacent the other end of said split clamping member, and a hook on said latch member to take over the other leg of said locking member, said latch member having a toggle action, and said arched resilient portions of said locking member permitting of diametrical expansion and contraction of said clamping member due to changes in temperature.

2. A split clamping member formed of a single strip of metal of a width sufficient for securing the ends of a pair of tubular members of an exhaust manifold system together so as to permit of longitudinal expansion and contraction of said pair of members due to changes in temperature, the ends of said split clamping member being separated by a short gap when positioned on said tubular members, a locking member comprising two substantially parallel legs having their ends connected together by arched resilient portions, said split clamping member having one leg of said locking member pivoted adjacent one of its ends, a latch member pivoted adjacent the other end of said split clamping member, a pivot pin for said latch member, means for preventing longitudinal movement of said pivot pin, and a hook on said latch member to take over the other leg of said locking member, said latch member having a toggle action, and said arched resilient portions of said locking member permitting of diametrical expansion and contraction of said clamping member due to changes in temperature.

3. A split clamping member formed of a single strip of metal of a width sufficient for securing the ends of a pair of tubular members of an exhaust manifold system together so as to permit of longitudinal expansion and contraction of said pair of members due to changes in temperature, the ends of said split clamping member being separated by a short gap when positioned on said tubular members, a locking member comprising two substantially parallel legs having their ends connected together by arched resilient portions, a strap secured to one end of said split clamping member, said strap being turned back on itself to form an eye, one of the legs of said locking member being pivoted in said eye, another strap secured to the other end of said split clamping member, said second mentioned strap being turned back on itself and slotted to form a pair of eyes, a latch member pivoted between said pair of eyes, a hook on said latch member to take over the other leg of said locking member, said latch member having a toggle action, and said arched resilient portions of said locking member permitting of diametrical expansion and contraction of said clamping member due to changes in temperature.

ROSCOE I. MARKEY.